(12) United States Patent
Song

(10) Patent No.: US 8,477,279 B2
(45) Date of Patent: Jul. 2, 2013

(54) LIQUID CRYSTAL DISPLAY AND THIN FILM TRANSISTOR ARRAY PANEL USABLE WITH THE LIQUID CRYSTAL DISPLAY

(75) Inventor: Jang-Kun Song, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/619,450

(22) Filed: Sep. 14, 2012

(65) Prior Publication Data

US 2013/0009159 A1 Jan. 10, 2013

Related U.S. Application Data

(60) Division of application No. 12/944,617, filed on Nov. 11, 2010, now Pat. No. 8,300,192, which is a continuation of application No. 11/245,679, filed on Oct. 6, 2005, now Pat. No. 7,852,444.

(30) Foreign Application Priority Data

Oct. 6, 2004 (KR) .......................... 10-2004-0079408

(51) Int. Cl.
*G02F 1/1343* (2006.01)

(52) U.S. Cl.
USPC .............................. 349/146; 349/44; 349/141

(58) Field of Classification Search
None
See application file for complete search history.

(56) References Cited

U.S. PATENT DOCUMENTS

| 5,702,776 | A | 12/1997 | Hayase et al. |
|---|---|---|---|
| 5,754,266 | A | 5/1998 | Ohta et al. |
| 5,943,107 | A | 8/1999 | Kadota et al. |
| 5,978,061 | A | 11/1999 | Miyazaki et al. |
| 6,118,505 | A | 9/2000 | Nagata et al. |
| 6,583,839 | B2 | 6/2003 | Suzuki et al. |
| 6,661,488 | B1 | 12/2003 | Takeda et al. |
| 2002/0024626 | A1 | 2/2002 | Lee et al. |
| 2002/0057411 | A1 | 5/2002 | Kim et al. |
| 2002/0118330 | A1 | 8/2002 | Lee |
| 2003/0112383 | A1 | 6/2003 | Kim |
| 2004/0169777 | A1 | 9/2004 | Tanaka et al. |

FOREIGN PATENT DOCUMENTS

| CN | 1181517 | 5/1998 |
|---|---|---|
| CN | 1472580 | 2/2004 |
| EP | 1006394 A1 | 6/2000 |
| EP | 1103840 A2 | 5/2001 |
| JP | 02-033031 U | 3/1990 |
| JP | 11-242225 A | 9/1999 |
| JP | 11-352513 A | 12/1999 |
| JP | 2000-002889 A | 1/2000 |
| JP | 2001-194671 A | 7/2001 |
| JP | 2001-281696 A | 10/2001 |
| JP | 2004-093846 A | 3/2004 |
| JP | 2004-199062 A | 7/2004 |
| KR | 1999-006951 A | 1/1999 |
| KR | 1020010087348 A | 9/2001 |
| KR | 1020020074056 A | 9/2002 |
| TW | 200401932 A | 2/2004 |
| TW | 200402888 A | 2/2004 |

*Primary Examiner* — Lucy Chien
(74) *Attorney, Agent, or Firm* — Innovation Counsel LLP

(57) ABSTRACT

A liquid crystal display with improved viewing angle and uncompromised transmittance is provided, along with a thin film transistor (TFT) array panel usable for such liquid crystal display. The TFT array panel includes a substrate, a plurality of gate lines formed on the substrate, a plurality of data lines formed on the substrate and intersecting the gate lines, and a plurality of thin film transistors. Each of the thin film transistors includes a gate electrode connected to one of the gate lines, a source electrode connected to one of the data lines, and a drain electrode. The TFT array panel also includes a plurality of pixel electrodes, each of the pixel electrodes connected to one of the drain electrodes and having a pair of oblique edges parallel to each other, and covering at least a portion of the drain electrodes.

11 Claims, 13 Drawing Sheets

LIQUID CRYSTAL DISPLAY AND THIN FILM TRANSISTOR ARRAY PANEL USABLE WITH THE LIQUID CRYSTAL DISPLAY

CROSS-REFERENCE TO RELATED APPLICATION

This is a divisional application of U.S. patent application Ser. No. 12/944,617, filed on Nov. 11, 2010, which patent application is a continuation application of U.S. patent application Ser. No. 11/245,679, filed on Oct. 6, 2005, now U.S. Pat. No. 7,852,444, which patent application claims priority from Korean Patent Application No. 10-2004-0079408, filed on Oct. 6, 2004, the contents of which are incorporated by reference herein in their entireties and for all purposes.

BACKGROUND OF THE INVENTION (a) Field of the Invention

The present invention relates to a liquid crystal display and a thin film transistor array panel usable therefore the liquid crystal display.

(b) Description of the Related Art

A liquid crystal display (LCD) is a widely used type of flat panel display. An LCD includes a liquid crystal (LC) layer interposed between a pair of panels provided with field-generating electrodes. The LC layer is subject to an electric field generated by the electrodes, and variations in the field strength change the molecular orientation of the LC layer. A change in the molecular orientation of the LC layer, in turn, changes the polarization of light passing through the LC layer. Light transmittance through the LC layer is changeable not only by controlling the strength of the electric field in the LC layer but also by using polarizer(s). Appropriately disposed polarizer(s) change light transmittance through the LC layer by affecting the polarization of light.

One measure of LCD quality is a viewing angle, which is defined by the angle from the perspective of a viewer where the LCD exhibits a predetermined contrast ratio. Various techniques for enlarging the viewing angle have been suggested, including utilizing a vertically aligned LC layer and providing cutouts or protrusions at the field-generating electrodes such as pixel electrodes and a common electrode.

Although using cutouts or protrusions with a vertically aligned LC layer does achieve the desired enlargement of the viewing angle, it also has a negative effect on the display quality in that cutouts and the protrusions reduce the transmittance. To compensate for the decrease in transmittance, it has been suggested that the size of the pixel electrodes be increased. However, an increase in the size of the pixel electrodes results in a closer distance between the pixel electrodes, which causes strong lateral electric fields between the pixel electrodes. Strong electric fields between pixel electrodes can be problematic as they cause unwanted altering of the orientation of the LC molecules, creating textures and light leakage and deteriorating display characteristics. Although the textures and the light leakage may be screened by a wide black matrix, using a wide black matrix also reduces the aperture ratio.

In addition to creating undesirable lateral inter-pixel electric fields, an increase in the size of the pixel electrodes may raise the parasitic capacitance between the pixel electrodes and the data lines. When an active area on a backplane for an LCD is too large to use an exposure mask, the entire exposure is accomplished by repeating a divisional exposure called step-and-repeat process. One divisional exposure unit or area is called a shot. Since transition, rotation, distortion, and etc. are generated during light exposure, the shots are not aligned accurately. Accordingly, the parasitic capacitances generated between signal lines and pixel electrodes differ depending on the shots, and this causes a luminance difference between the shots. This difference in luminance is recognized at the pixels located at a boundary between the shots, generating a stitch defect on the LCD screen.

In addition to the above problems associated with enlarged pixel electrodes, there is also the issue of a parasitic capacitance between the data lines and the common electrode that may cause disorder of liquid crystal molecules.

A method of enlarging the viewing angle without the aforementioned problems is desired.

SUMMARY OF THE INVENTION

In one aspect, the invention is a thin film transistor (TFT) array panel. The TFT array panel includes: a substrate, a plurality of gate lines formed on the substrate, a plurality of data lines formed on the substrate and intersecting the gate lines, and a plurality of thin film transistors. Each of the thin film transistors includes a gate electrode connected to one of the gate lines, a source electrode connected to one of the data lines, and a drain electrode. The TFT array panel also includes a plurality of pixel electrodes. Each of the pixel electrodes is connected to one of the drain electrodes, and the pixel electrodes have a pair of oblique edges parallel to each other and covering at least a portion of the drain electrodes.

Each of the data lines may overlap two adjacent pixel electrodes.

Each of the pixel electrodes may overlap two data lines.

An overlapping area between each of the pixel electrodes and one of the two data lines may be equal to about a half of to about twice an overlapping area between each of the pixel electrodes and the other of the two data lines.

Each of the data lines may include a pair of bent portions disposed between two adjacent gate lines and overlapping the pixel electrodes.

Each of the data lines may further include a linear oblique portion connected to the corner portions of the pixel electrodes and overlapping the pixel electrodes.

Each of the data lines may include a bent portion disposed between two adjacent gate lines and bending at least twice.

The bent portions of the data lines may be equidistant from the oblique edges of the pixel electrodes.

Each of the data lines may include a linear oblique portion that is parallel to the oblique edges of the pixel electrodes and overlapping the pixel electrodes.

Each of the data lines may include a bent portion extending substantially parallel to the bent edges of the pixel electrodes and a linear portion intersecting the gate lines.

The bent portion of each of the data lines may include a pair of linear oblique portions making an angle of about 45 degrees with the gate lines.

The bent portions of the data lines may overlap the pixel electrodes.

The bent portions of the data lines may be disposed near centers of the pixel electrodes and covered with the pixel electrodes.

The thin film transistor array panel may further include a plurality of storage electrode lines including storage electrodes that overlap the drain electrodes.

The storage electrode lines may further include branches disposed between the pixel electrodes and partially overlapping the pixel electrodes.

The thin film transistor array panel may further include a plurality of color filters partially overlapping the branches of the storage electrode lines and overlapping the pixel electrodes.

The data lines may have a width of about four microns to about eight microns.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1A:
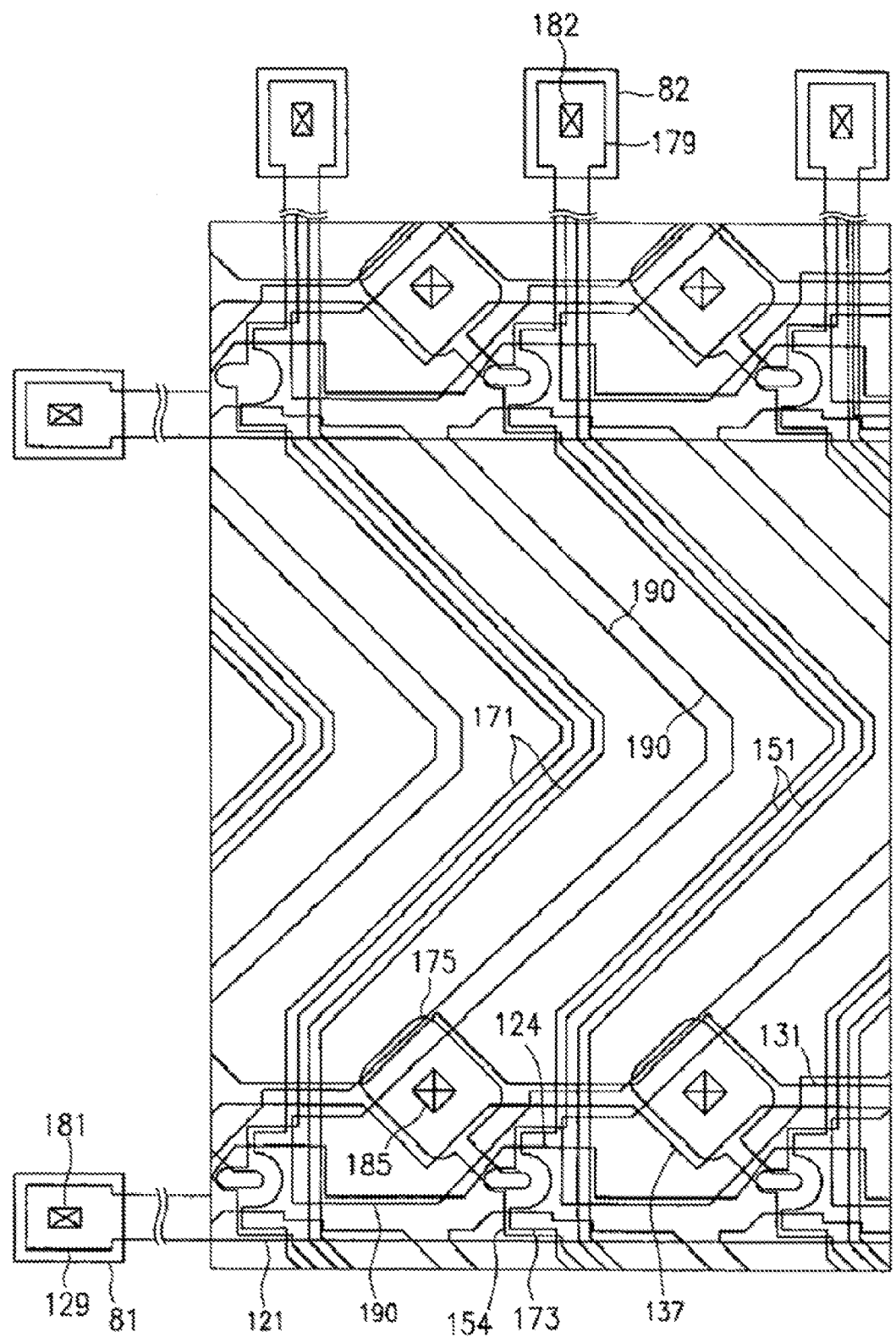
FIG. 1A is a layout view of a TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present.

Figure 1B:
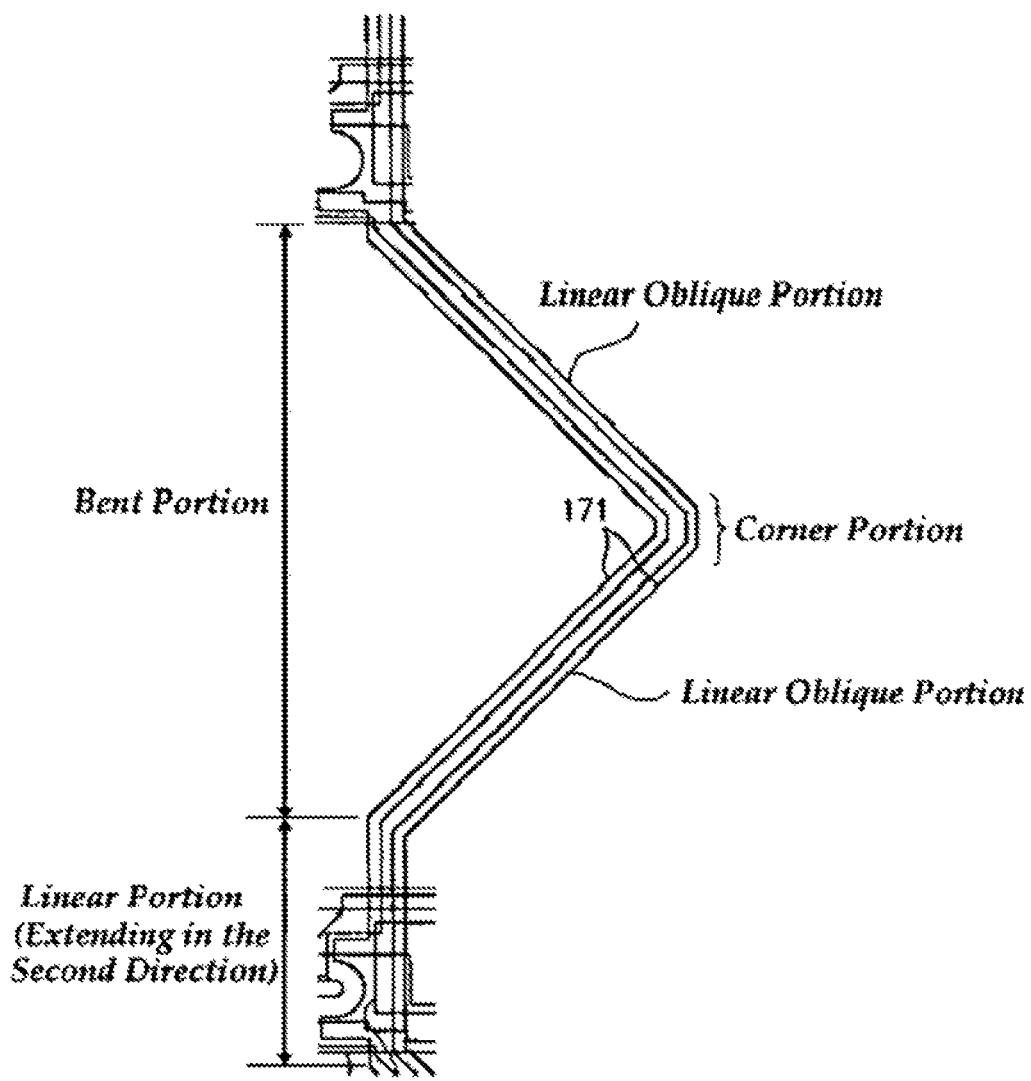
FIG. 1B is an isolated view of the data lines of FIG. 1A, further illustrating details of the geometry.
Figure 2:
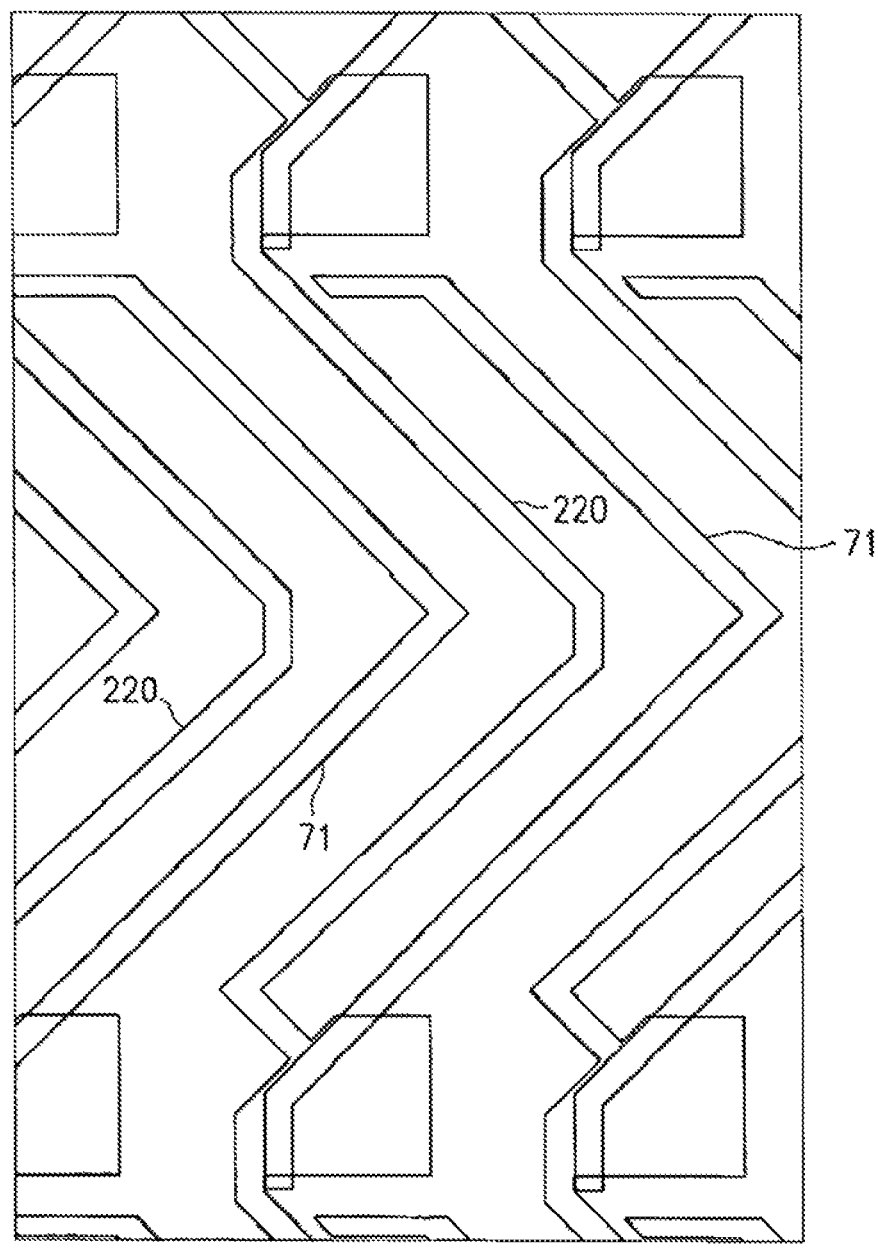
FIG. 2 is a layout view of a common electrode panel for an LCD according to an embodiment of the present invention.
Figure 3A:
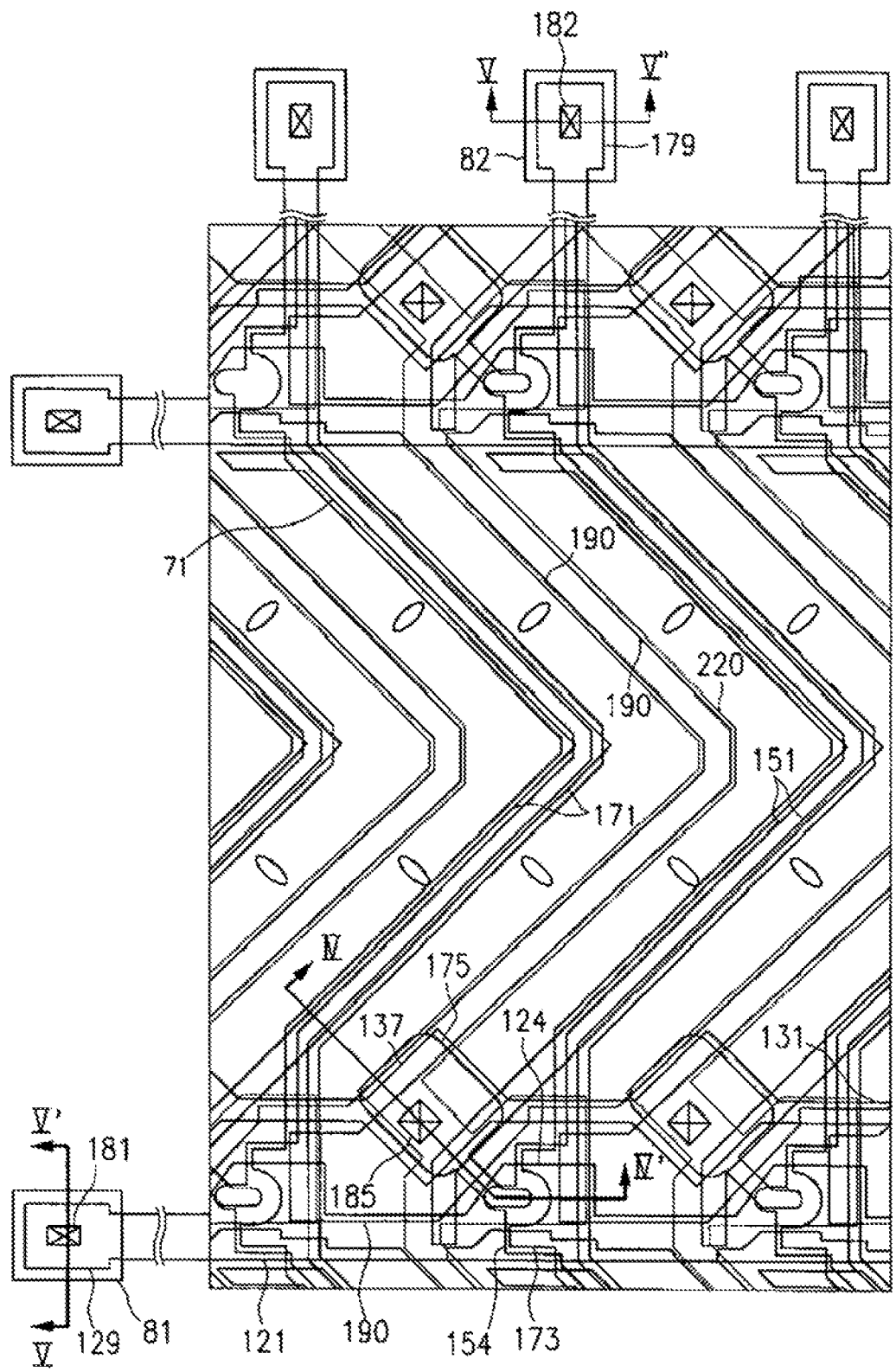
FIG. 3A is a layout view of an LCD including the TFT array panel shown in FIG. 1 and the common electrode panel shown in FIG. 2.
Figure 3B:
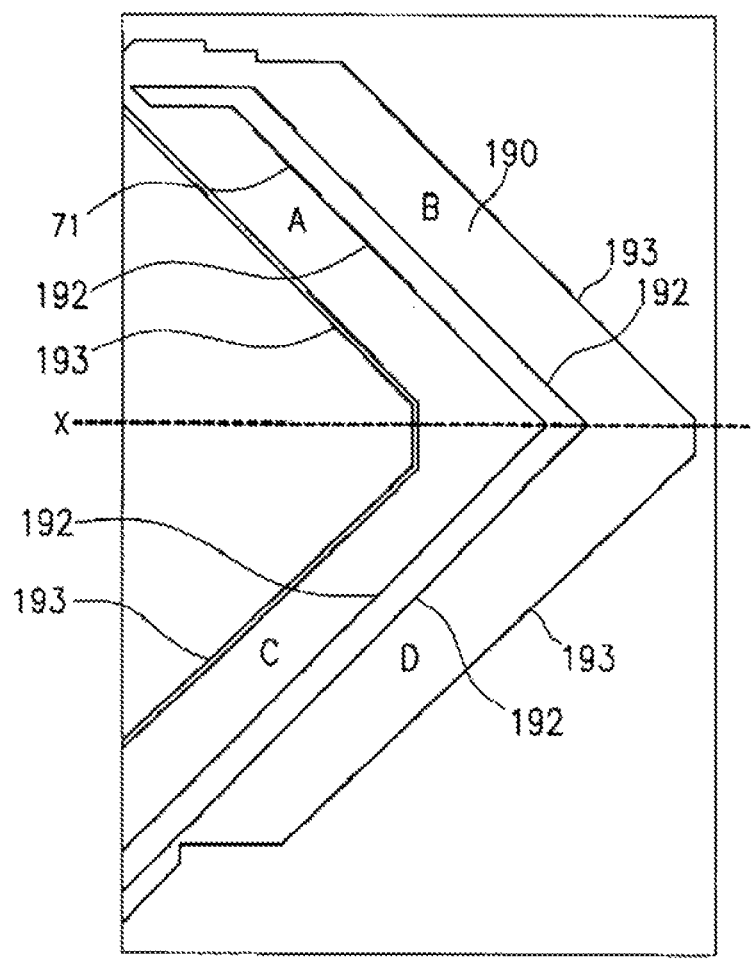
FIG. 3B is a layout view of a pixel electrode of FIG. 3A.
Figure 4:
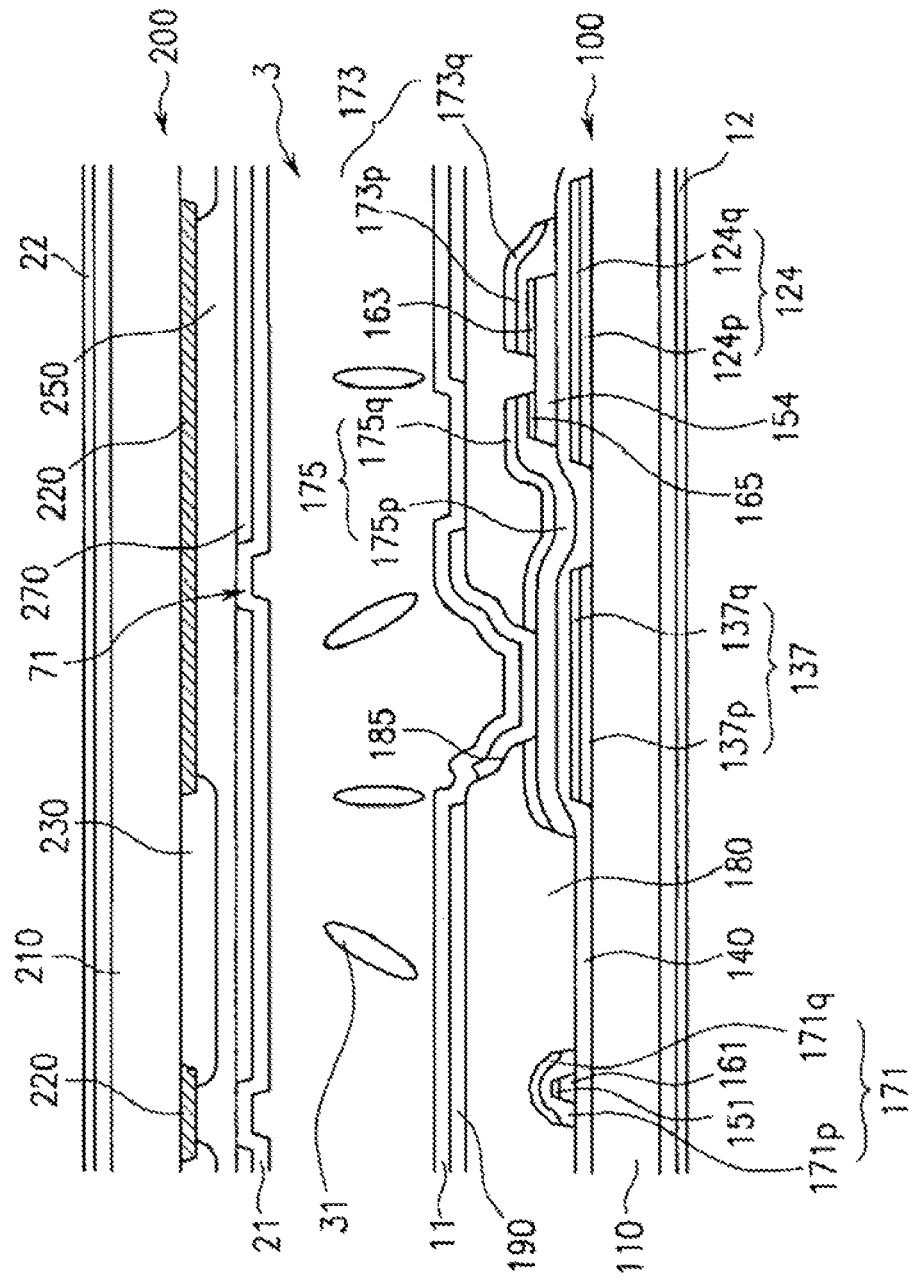
FIG. 4 is a sectional view of the LCD shown in FIG. 3A taken along the line IV-IV'.
Figure 5:
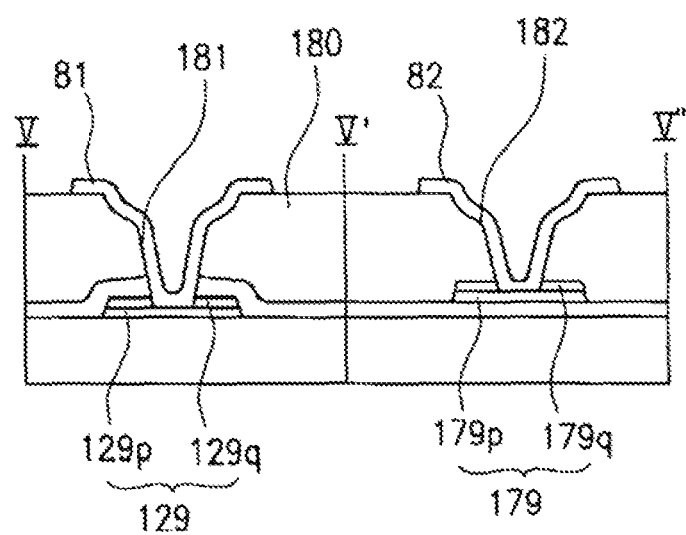
FIG. 5 is a sectional view of the LCD shown in FIG. 3A taken along the lines V-V'.

An LCD according to an embodiment of the present invention is described in detail with reference to FIGS. 1-5. FIG. 1 is a layout view of a TFT array panel for an LCD according to an embodiment of the present invention, FIG. 2 is a layout view of a common electrode panel for an LCD according to an embodiment of the present invention, FIG. 3A is a layout view of an LCD including the TFT array panel shown in FIG. 1 and the common electrode panel shown in FIG. 2, FIG. 3B is a layout view of a pixel electrode shown in FIG. 3A, FIG. 4 is a sectional view of the LCD shown in FIG. 3A taken along the line IV-IV', and FIG. 5 is a sectional view of the LCD shown in FIG. 3A taken along the lines V-V'.

An LCD according to an embodiment of the present invention includes a TFT array panel 100, a common electrode panel 200 facing the TFT array panel 100, and a LC layer 3 interposed between the TFT array panel 100 and the common electrode panel 200.

The TFT array panel 100 will be described in detail with reference to FIGS. 1 and 3-5.

A plurality of gate lines 121 and a plurality of storage electrode lines 131 are formed on an insulating substrate 110, which may be transparent glass or plastic.

The gate lines 121 transmit gate signals and extend substantially in a first direction, which is the horizontal/transverse direction with respect to the Figures. Each of the gate lines 121 includes a plurality of gate electrodes 124 projecting upward and an end portion 129 having a large area of contact for connecting with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrodes 131 are supplied with a predetermined voltage and extend substantially parallel to the gate lines 121. Each of the storage electrode lines 131 is disposed between two adjacent gate lines 121 and is close to the lower one of the two adjacent gate lines 121 ("lower" being with respect to the view of FIG. 1). Each of the storage electrode lines 131 includes a plurality of storage electrodes 137 having a shape of a rhombus (or a rectangle rotated by about 45 degrees). In other embodiments, the storage electrode lines 131 may have different shapes and arrangements.

The gate lines 121 and the storage electrode lines 131 include two layers of conductive films that have different physical characteristics: a lower film and an upper film disposed on the lower film. The upper film is preferably made of a low-resistivity metal such as an Al-containing metal (e.g., Al and Al alloy), an Ag-containing metal (e.g., Ag and Ag alloy), and a Cu-containing metal (e.g., Cu and Cu alloy), for reducing signal delay or voltage drop. The lower film is preferably made of a material such as Mo-containing metal (e.g., Mo and Mo alloy), Cr, Ta, or Ti, which has good physical, chemical, and electrical contact characteristics with other materials such as indium tin oxide (ITO) or indium zinc oxide (IZO). A good example of the combination of the two films is a lower Cr film and an upper Al (alloy) film. The upper film 129q of the end portions 129 of the gate lines 121 is removed to expose the lower film 129p.

In some embodiments, the upper film may be made of good contact material, and the lower film may be made of low resistivity material. In addition, the gate lines 121 and the storage electrode lines 131 may include a single layer preferably made of the above-described materials. Also, the gate lines 121 and the storage electrode lines 131 may be made of other metals or conductors.

In FIGS. 4 and 5, for the gate electrodes 124 and the storage electrodes 137, the lower and upper films thereof are denoted by additional characters p and q, respectively.

The lateral sides of the gate lines 121 and the storage electrode lines 131 are inclined relative to a surface of the substrate 110, and the inclination angle ranges between about 30 and about 80 degrees.

A gate insulating layer 140 preferably made of silicon nitride (SiNx) or silicon oxide (SiOx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each of the semiconductor stripes 151 is made up of linear portions and corners, and extends generally in a second direction that is perpendicular to the first direction. Each of the semiconductor stripes 151 has a plurality of projections 154 branching out toward the gate electrodes 124.

A plurality of ohmic contact stripes and islands 161 and 165 are formed on the semiconductor stripes 151. The ohmic contact stripes and islands 161 and 165 are preferably made of n+ hydrogenated a-Si heavily doped with an n-type impurity such as phosphorus, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles are preferably in a range of about 30 to about 80 degrees.

A plurality of data lines 171 and a plurality of drain electrodes 175 are formed on the ohmic contacts 161 and 165 and the gate insulating layer 140.

The data lines 171 transmit data signals and extend generally in the second direction to intersect the gate lines 121 and the storage electrode lines 131. Each of the data lines 171 includes one or more bent portions that include a plurality of linear oblique portions that are connected by a corner portion (see FIG. 1B). Each of the corner portions includes angles connected to each other through a linear portion. The linear oblique portions of the data lines 171 that extend from the corner portion make an angle of about 45 degrees with the gate lines 121. Each of the linear portions extending in the second direction intersects the gate lines 121 and includes a plurality of source electrodes 173 projecting toward the gate electrodes 124. Each of the corner portions may have two or more angles.

Each data line 171 further includes an end portion 179 having a large area for contact with another layer or an external device. A data driving circuit (not shown) for generating the data signals may be mounted on an FPC film (not shown), which may be attached to the substrate 110, directly mounted on the substrate 110, or integrated onto the substrate 110. The data lines 171 may extend to be connected to a driving circuit that may be integrated on the substrate 110.

The length of a pair of linear oblique portions is about one to nine times the length of the linear portion extending in the second direction. That is, the combined length of two linear oblique portions occupies about 50-90 percents of the total length of the pair of linear oblique portions and the linear portion extending in the second direction. The pair of linear oblique portions may be substituted with three or more linear oblique portions such that a part of a data line 171 between adjacent linear portions extending in the second direction has two or more corner portions.

The drain electrodes 175 are separated from the data lines 171 and disposed opposite the source electrodes 173 with respect to the gate electrodes 124. Each of the drain electrodes 175 includes a rectangular or rhombic end portion and a narrow end portion. The rhombic end portion overlaps a storage electrode and the narrow end portion is partly enclosed by a source electrode 173 that is curved like a character J (see FIG. 1).

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 include two conductive films that have different physical characteristics: lower film 171$p$ and 175$p$ and upper films 171$q$ and 175$q$ disposed thereon, respectively. The upper films 171$q$ and 175$q$ are preferably made of a low-resistivity metal such as an Al-containing metal (e.g., Al and Al alloy), an Ag-containing metal (e.g., Ag and Ag alloy), and a Cu-containing metal (e.g., Cu and Cu alloy), for reducing signal delay or voltage drop. The lower film 171$p$ and 175$p$ is preferably made of refractory metal such as Cr, Mo, Ta, Ti, or alloys thereof. A good example of the combination of the two films is a lower Cr/Mo (alloy) film and an upper Al (alloy) film. The upper film 179$q$ of the end portions 179 of the gate lines 171 is removed to expose the lower film 179$p$. However, the data lines 171 and the drain electrodes 175 may include a single layer preferably made of the above-described materials. Otherwise, the data lines 171 and the drain electrodes 175 may be made of various metals or conductors.

In FIGS. 4 and 5, for the source electrodes 173, the lower and upper films thereof are denoted by additional characters p and q, respectively.

The data lines 171 and the drain electrodes 175 have inclined edge profiles, and the inclination angles range between about 30 and about 80 degrees with respect to the substrate 110.

The ohmic contacts 161 and 165 are interposed only between the underlying semiconductor stripes 151 and the overlying conductors 171 and 175, and reduce the contact resistance between the semiconductor stripes 151 and the overlying conductors 171, 175. The semiconductor stripes 151 include some exposed portions that are not covered with the data lines 171 and the drain electrodes 175, such as portions located between the source electrodes 173 and the drain electrodes 175 (the semiconductor stripe 151 includes the projection 154).

A passivation layer 180 is formed on the data lines 171, the drain electrodes 175, and the exposed portions of the semiconductor stripes 151. The passivation layer 180 is preferably made of inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film of inorganic insulator and an upper film of organic insulator such that it demonstrates the excellent insulating characteristics of the organic insulator while preventing the exposed portions of the semiconductor stripes 151 from being damaged by the organic insulator.

The passivation layer 180 has a plurality of contact holes 182 and 185 exposing the lower film 179$p$ of the end portions 179 of the data lines 171 and the lower film 175$p$ of the rhombic end portions of the drain electrodes 175, respectively. The passivation layer 180 and the gate insulating layer 140 have a plurality of contact holes 181 exposing the lower film 129$p$ of the end portions 129 of the gate lines 121.

A plurality of pixel electrodes 190 and a plurality of contact assistants 81 and 82 are formed on the passivation layer 180. They are preferably made of transparent conductor such as ITO or IZO or reflective conductor such as Ag, Al, Cr, or alloys thereof.

The pixel electrodes 190 are electrically connected to the drain electrodes 175 of the TFTs through the contact holes 185 such that the pixel electrodes 190 receive data voltages from the drain electrodes 175. The pixel electrodes 190 supplied with the data voltages generate electric fields in cooperation with a common electrode 270 of the common electrode panel 200 supplied with a common voltage, which determine the orientations of liquid crystal molecules 31 of the liquid crystal layer 3 disposed between the two electrodes 190 and 270. A pixel electrode 190 and the common electrode form a capacitor referred to as a "liquid crystal capacitor," which stores applied voltages after the TFT turns off.

Each of the pixel electrodes 190 includes a plurality of edges substantially parallel to the linear oblique portions of the data lines 171 and a plurality of linear portions substantially parallel to the gate lines 121 and the data lines 171. Thus, the pixel electrode 190 forms a chevron with a flattened corner. The pixel electrodes 190 cover the storage electrode lines 131 including the storage electrodes 137 and the rhombic end portions of the drain electrodes 175.

In addition, each of the pixel electrodes 190 substantially fully covers a data line 171 such that the data line 171 nearly bisects the pixel electrodes 190 into two halves. Each of the pixel electrodes 190 partially overlaps a portion of an adjacent data line 171 near a TFT that transmits the data voltages to an adjacent pixel electrode 190.

Such a substantially full coverage of the data lines 171 by the pixel electrodes 190 results in uniformity of parasitic capacitances regardless of misalignment and prevents parasitic electric fields generated between the data lines 171 and the common electrode 270. Furthermore, the overlap of a pixel electrode 190 with two adjacent data lines 171 compensates for the voltage variation due to the parasitic capacitances between the pixel electrode 190 and the data lines 171 when the adjacent data lines 171 transmit data voltages having opposite polarities with respect to the common voltage. In detail, the voltage variation of the pixel electrode 190 depends on the voltage variation of the data lines 171, and the two data lines 171 varies their voltages in opposites directions, that is, one of the two data lines 171 changes the polarity of the data voltages carried by the one of the two data lines 171 from positive to negative, while the other of the two data lines 171 changes the polarity of the data voltages carried by the other of the two data lines 171 from negative to positive. Accordingly, the voltage variation of the pixel electrode 190 is reduced as compared with a case that the pixel electrode 190 overlaps only one data line 171.

A pixel electrode 190 and a rhombic end portion of a drain electrode 175 connected thereto overlap a storage electrode line 131 including a storage electrode 137. The pixel electrode 190 and the drain electrode 175 connected thereto and the storage electrode line 131 form an additional capacitor referred to as a "storage capacitor," which enhances the voltage storing capacity of the liquid crystal capacitor.

The pixel electrodes 190 overlap the data lines 171 as well as the gate lines 121 to increase the aperture ratio.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-5.

A light blocking member 220 called a black matrix 220 is formed on an insulating substrate 210, which may be transparent glass or plastic. The light blocking member 220 includes a plurality of curved portions facing gaps between the pixel electrodes 190 and a plurality of planar portions facing the TFTs such that the light blocking member 220 blocks light leakage between the pixel electrodes 190 and defines open areas facing the pixel electrodes 190. In other embodiments, the light blocking member 220 may have a plurality of openings (not shown) that face the pixel electrodes 190 and have almost the same shape as the pixel electrodes 190.

A plurality of color filters 230 are formed on the substrate 210 and the light blocking member 220. The color filters 230 are disposed substantially in the open areas defined by the light blocking member 220 and the color filters 230 may extend along columns of the pixel electrodes 190. Each of the color filters 230 may represent one of the primary colors (red, green and blue).

An overcoat 250 preferably made of (organic) insulator is formed on the color filters 230 and the light blocking member 220. The overcoat 250 prevents the color filters 230 from being exposed and provides a flat surface. The overcoat 250 may be omitted in some embodiments.

A common electrode 270 is formed on the overcoat 250. The common electrode 270 is preferably made of a transparent conductive material such as ITO and IZO and it has a plurality of chevron-like cutouts 71 (see FIG. 2).

As shown in FIG. 2, each cutout 71 has a corner portion that includes a substantially right angle, a first linear oblique portion connected to one end of the corner portion, and a second linear oblique portion connected to the other end of the corner portion. A linear portion extending substantially in the first direction is connected to the first linear oblique portion, and another linear portion extending substantially in the second direction is connected to the second linear oblique portion. The corner portion of the cutout 71 extends along the corner portions of the data lines 171 and faces a pixel electrode 190 so that the corner portion may bisect the pixel electrode 190 into two halves. The linear portions of the cutout 71 that extend in the first and second directions form two obtuse angles with the bent portion of the cutout 71, and they may be aligned with the edges of the pixel electrode 190 (e.g., the edges that extend in the first and second directions). The width of the cutout 71 may be equal to about 9 microns to about 12 microns.

Alignment layers (not shown) that may be homeotropic are coated on inner surfaces of the panels 100 and 200, and polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules 31 in the LC layer 3 are aligned such that their long axes are substantially vertical to the surfaces of the panels 100 and 200 in the absence of an electric field. Accordingly, incident light cannot pass the crossed polarization system 12 and 22.

Upon application of the common voltage to the common electrode 270 and a data voltage to the pixel electrodes 190, a primary electric field substantially perpendicular to the surfaces of the panels 100 and 200 is generated. The pixel electrodes 190 and the common electrode 270 are commonly referred to as field generating electrodes. The LC molecules 31 tend to change their orientations in response to the electric field so that their long axes may be perpendicular to the field direction.

The cutouts 71 of the common electrode 270 and the edges of the pixel electrodes 190 distort the primary electric field to have a horizontal component that determines the tilt directions of the LC molecules 31. The horizontal component of the primary electric field is perpendicular to the edges of the cutouts 71 and the edges of the pixel electrodes 190.

Referring to FIG. 3B, a cutout 71 bisects the pixel electrode 190 into two approximately V-shaped sections, and an imaginary line X extends through the corner portions of the pixel electrode 190. The cutout 71 and the imaginary line X together divide the pixel electrode 190 into four quadrants (labeled A, B, C, and D), and each quadrant has two major edges 192, 193. The first major edge 192 is defined by the oblique linear portions of the cutout 71, and the second major edge 193 is defined by the oblique edges of the pixel electrode 290. The major edges 192, 193 of the quadrants may make an angle of about 45 degrees with the polarization axes of the polarizers 11 and 21 to maximize the light efficiency. The distance between the first major edge 192 and the second major edge 193 in each quadrant may be equal to about 10 microns to about 30 microns.

Since most of the LC molecules 31 on each quadrant tilt perpendicular to the major edges 192, 193, the azimuthal distribution of the tilt directions are localized to about four directions. The various molecular tilt angles increase the reference viewing angle of the LCD.

The pixel electrode 190 is not limited to being divided into quadrants, and may be divided into eight or six sub-areas instead of four. This can be achieved by changing the number of the cutouts 71 at the common electrode 270 (e.g., so that two cutouts 71 divide a pixel electrode 190 into three V-shaped regions), by providing cutouts at the pixel electrodes 190, or by changing the number of bent portions in the pixel electrodes 190 (and thus changing the number of imaginary line X).

The direction of a secondary electric field due to the voltage difference between the pixel electrodes 190 is perpendicular to the major edges of the quadrants. Accordingly, the field direction of the secondary electric field coincides with that of the horizontal component of the primary electric field. Consequently, the secondary electric field between the pixel electrodes 190 enhances the determination of the tilt directions of the LC molecules 31.

The cutouts 71 can be substituted with protrusions (not shown) or depressions (not shown). The protrusions are preferably made of organic or inorganic material and disposed on or under the field-generating electrodes 190 or 270. The width of the protrusions may be equal to about 5 microns to about 10 microns.

Various modifications may be made to the LCD shown in FIGS. 1-5.

For example, the pixel electrodes 190 as well as the common electrode 270 may have cutouts (not shown) for generating a fringe field. Furthermore, the cutouts may be substituted with protrusions disposed on the common electrode 270 or the pixel electrodes 190.

The shapes and the arrangements of the cutouts or the protrusions may be varied depending on design factors such as the pixel size, the ratio of the lengths of the linear edges of the pixel electrodes, the type and characteristics of the liquid crystal layer 3, and so on.

In another embodiment, the pixel electrodes 190 and the common electrode 270 may have no cutout or protrusion for controlling the molecular tilt directions of the LC layer.

In yet another embodiment, the LC layer 3 has positive dielectric anisotropy and is aligned in a twisted nematic mode, such that the LC molecules are aligned parallel to surfaces of the panels 100 and 200 and twisted by an approximately right angle from the TFT array panel 100 to the common electrode panel 200 in the absence of electric field.

In yet another embodiment, the pixel electrodes 190, the data lines 171, the semiconductor stripes 151, the ohmic contact stripes 161, the light blocking members 220, the color filters 230, etc., may be straight or rectangular rather than curved, oblique, rhombic, or parallelogrammic.

A method of manufacturing the TFT array panel shown in FIGS. 1-5 according to an embodiment of the present invention will be now described in detail.

First, a lower conductive film preferably made of Cr, Mo, or Mo alloy and an upper conductive film preferably made of an Al-containing metal or an Ag-containing metal are sputtered sequentially on an insulating substrate 110 and they are wet or dry etched sequentially to form a plurality of gate lines 121 including gate electrodes 124 and end portions 129 and a plurality of storage electrode lines 131 including storage electrodes 137.

After sequential chemical vapor deposition of a gate insulating layer 140 with thickness of about 1,500-5,000 Å, an intrinsic a-Si layer with a thickness of about 500-2,000 Å, and an extrinsic a-Si layer with a thickness of about 300-600 Å, the extrinsic a-Si layer and the intrinsic a-Si layer are photo-etched to form a plurality of extrinsic semiconductor stripes and a plurality of intrinsic semiconductor stripes 151 including projections 154 on the gate insulating layer 140.

Subsequently, two conductive films including a lower conductive film and an upper conductive film and having a thickness of 1,500-3,000 Å are sputtered in sequence and patterned to form a plurality of data lines 171 including source electrodes 173 and end portions 179 and a plurality of drain electrodes 175. The lower conductive film is preferably made of Cr, Mo, or Mo alloy, and the upper conductive film is preferably made of an Al-containing metal or an Ag-containing metal.

Thereafter, portions of the extrinsic semiconductor stripes, which are not covered with the data lines 171 and the drain electrodes 175, are removed to complete a plurality of ohmic contact stripes 161 including projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Next, a passivation layer 180 made of a photosensitive organic insulator is coated and exposed through a photo-mask having a plurality of transmissive areas and a plurality of slit areas disposed around the transmissive areas. Accordingly, portions of the passivation layer 180 in the transmissive areas absorb the full energy of the light, while portions of the passivation layer 180 in the slit areas partially absorb the light energy. The passivation layer 180 is then developed to form a plurality of contact holes 182 and 185 exposing the end portions 179 of the data lines 171 and the drain electrodes 175, respectively, and to form upper portions of a plurality of contact holes 181 exposing portions of the gate insulating layer 140 disposed on the end portions 129 of the gate lines 121. Since the portions of the passivation layer 180 facing the transmissive areas are removed to its full thickness, while the portions facing the slit areas remain to have reduced thickness, sidewalls of the contact holes 181, 182 and 185 have stepped profiles.

After removing the exposed portions of the gate insulating layer 140 to expose the underlying portions of the end portions 129 of the gate lines 121, the exposed portions of the upper conductive films 129q, 175q and 179q of the end portions 129 of the gate lines 121, the drain electrodes 175, and the end portions 179 of the data lines 171 are removed to expose underlying portions of the lower conductive films 129p, 175p and 179p of the end portions 129 of the gate lines 121, the drain electrodes 175, the end portions 179 of the data lines 171.

Finally, a plurality of pixel electrodes 190 and a plurality of contact assistants 81 and 82 are formed on the passivation layer 180 and on the exposed portions of the lower conductive films 129p, 175p and 179p of the end portions 129 of the gate lines 121, the drain electrodes 175, the end portions 179 of the data lines 171 by sputtering and photo-etching an IZO or ITO layer with thickness of about 400-500 Å.

An LCD according to another embodiment of the present invention will be described in detail with reference to FIGS. 6, 7, 8 and 9.

Figure 6:
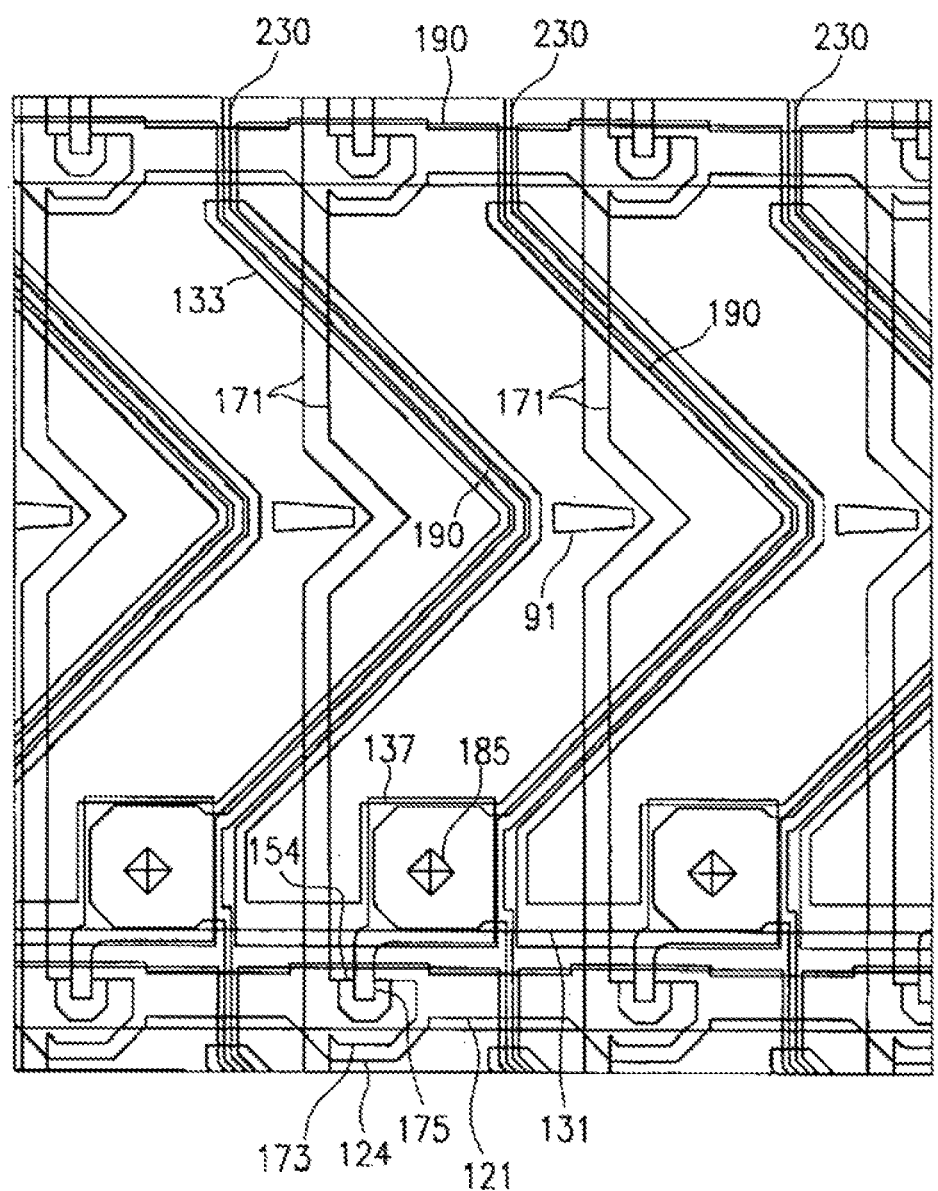
FIG. 6 is a layout view of a TFT array panel for an LCD according to another embodiment of the present invention.
Figure 7:
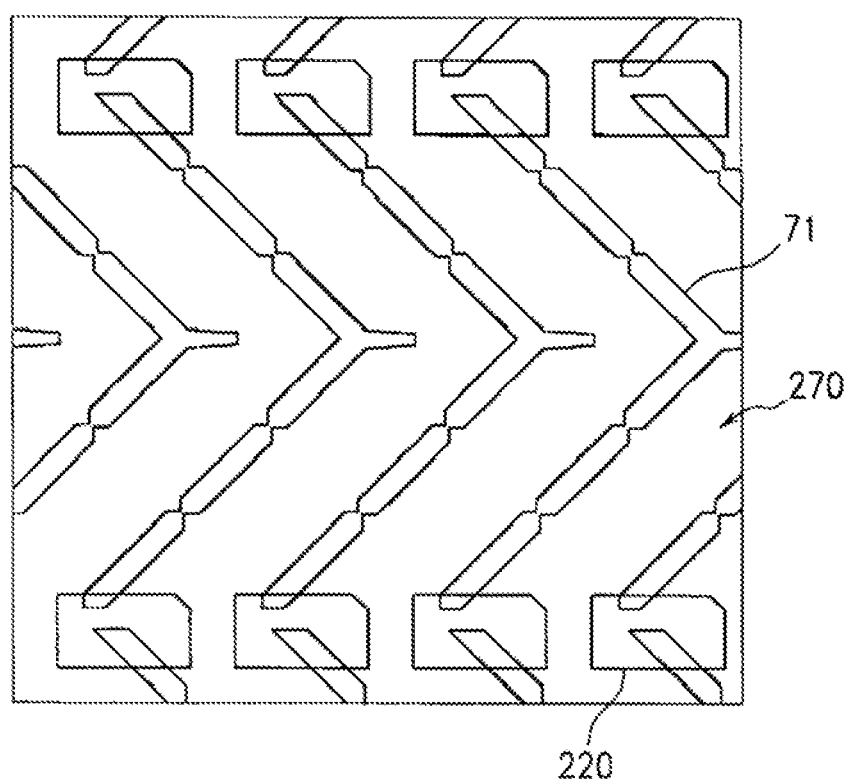
FIG. 7 is a layout view of a common electrode panel for an LCD according to another embodiment of the present invention.
Figure 8:
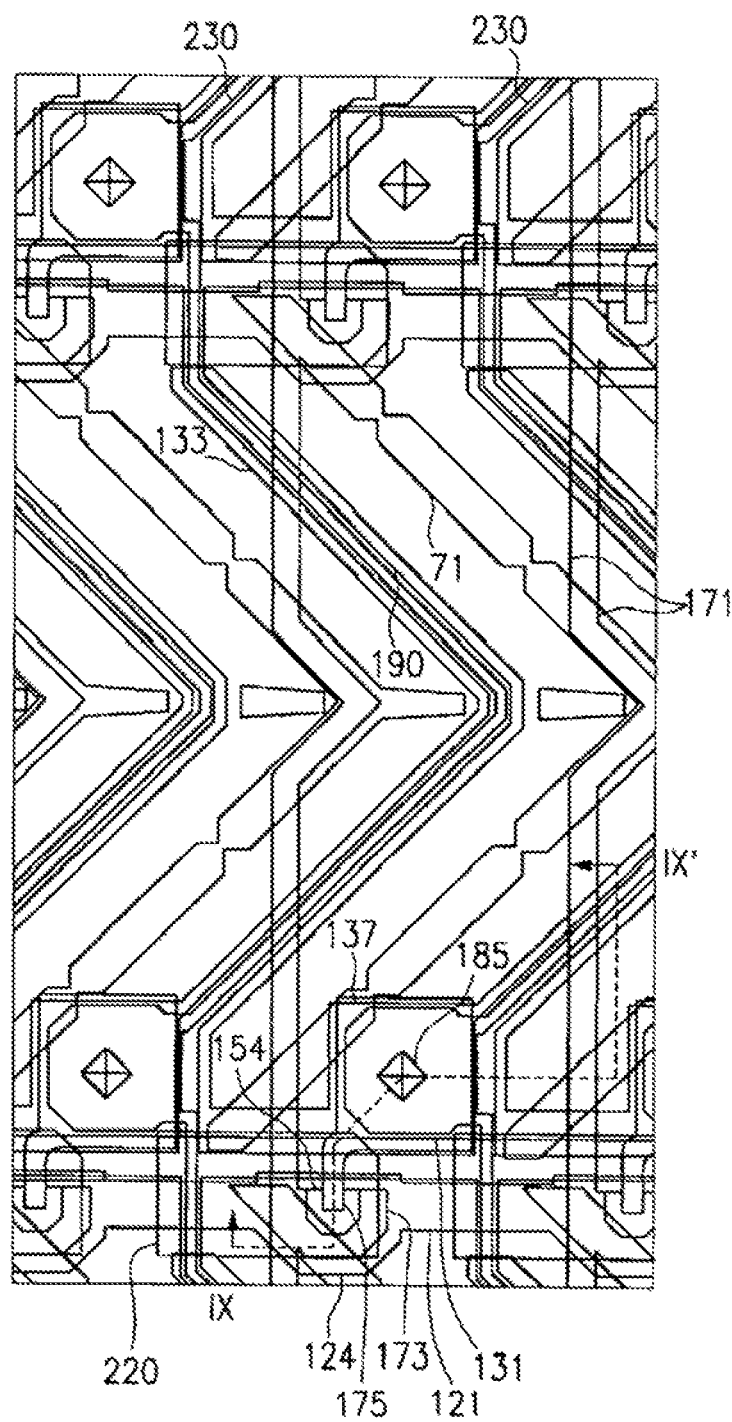
FIG. 8 is a layout view of an LCD including the TFT array panel shown in FIG. 6 and the common electrode panel shown in FIG. 7.
Figure 9:
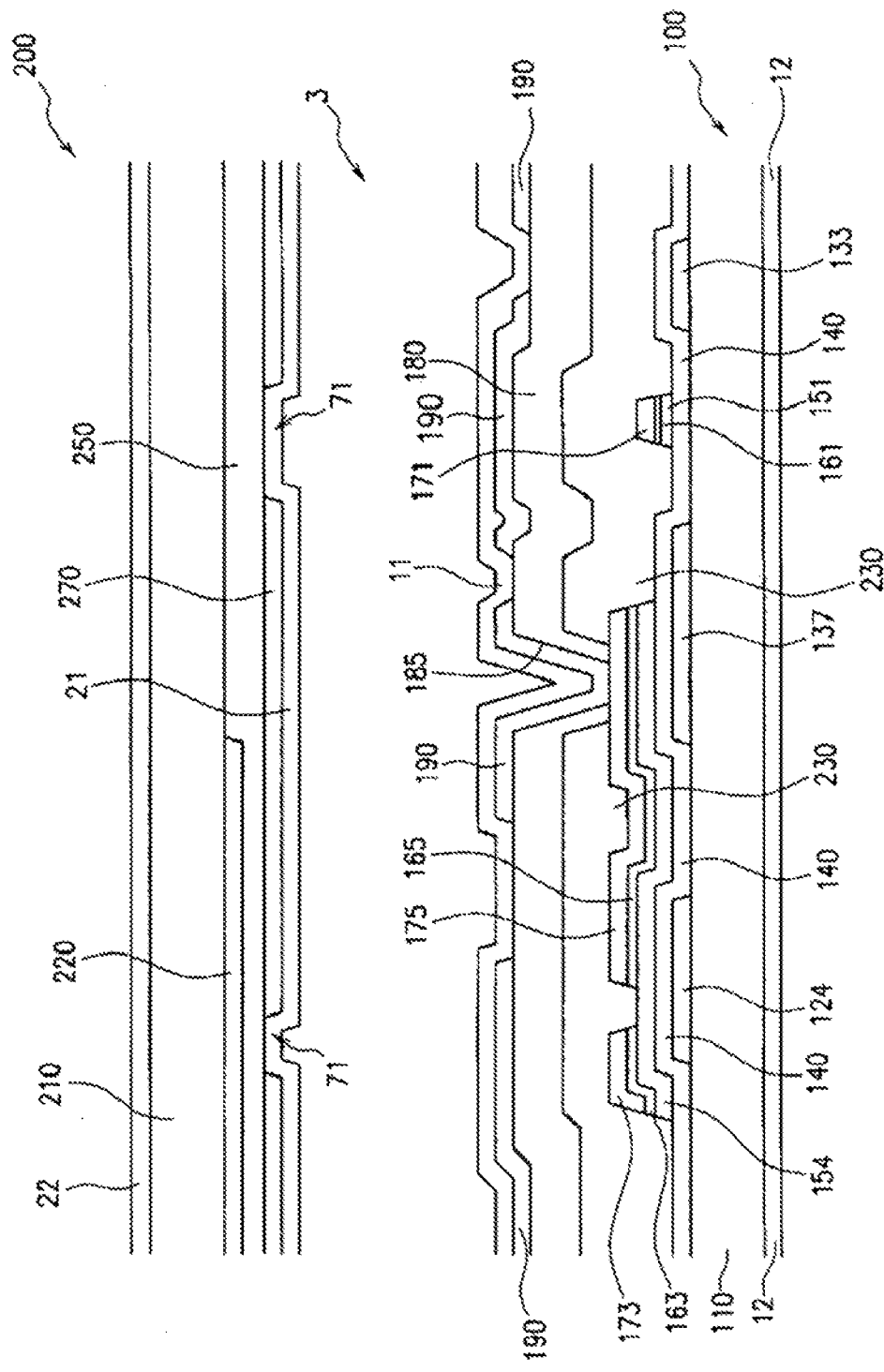
FIG. 9 is a sectional view of the LCD shown in FIG. 8 taken along line IX-IX'.

FIG. 6 is a layout view of a TFT array panel for an LCD according to another embodiment of the present invention, FIG. 7 is a layout view of a common electrode panel for an LCD according to another embodiment of the present invention, FIG. 8 is a layout view of an LCD including the TFT array panel shown in FIG. 6 and the common electrode panel shown in FIG. 7, and FIG. 9 is a sectional view of the LCD shown in FIG. 8 taken along line IX-IX'.

Referring to FIGS. 6-9, an LCD according to this embodiment also includes a TFT array panel 100, a common electrode panel 200, an LC layer 300 interposed between the panels 100 and 200, and a pair of polarizers 12 and 22 attached on the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and end portions 129 and a plurality of storage electrode lines 131 including a plurality of storage electrodes 137 are formed on a substrate 110. A gate insulating layer 140, a plurality of semiconductor stripes 151 including projections 154, and a plurality of ohmic contact stripes 161 including projections 163 and a plurality of ohmic contact islands 165 are sequentially formed on the substrate 110 provided with the gate lines 121 and the storage electrode lines 131. A plurality of data lines 171 including source electrodes 173 and end portions 179 and a plurality of drain electrodes 175 are formed on the ohmic contacts 161 and 165, and a passivation layer 180 is formed thereon. A plurality of contact holes 181, 182 and 185 are provided at the passivation layer 180 and the gate insulating layer 140, and a plurality of pixel electrodes 190 and a plurality of contact assistants 81 and 82 are formed on the passivation layer 180. An alignment layer 11 is formed on the pixel electrodes 190 and the passivation layer 180.

Regarding the common electrode panel 200, a light blocking member 220, a plurality of color filters 230, an overcoat 250, a common electrode 270 having a plurality of cutouts 71, and an alignment layer 21 are formed on an insulating substrate 210.

Different from the LCD shown in FIGS. 1-5, the data lines 171 in the LCD according to this embodiment have relatively long linear portions that extend in the second direction and relatively short bent portions. The bent portions of the data lines 171 are disposed near centers of the pixel electrodes 190.

Each of the pixel electrodes 190 overlaps two data lines 171 adjacent to the pixel electrode 190 and the overlapping area between the pixel electrode 190 and one of the two data lines 171 is nearly equal to the overlapping area between the pixel electrode 190 and the other of the two data lines 171 such that the parasitic capacitances made by the pixel electrode 190 and the two data lines 171 are nearly the same. As described above with reference to FIGS. 1-5, when the two data lines 171 transmit data voltages having opposite polarities, the voltage variations of the pixel electrode 190 due to the parasitic capacitances compensate for each other to reduce the net voltage change of the pixel electrode 190.

The ratio of the overlapping areas may be varied from about 1:1 to about 1:2.

The width of the data lines 171 may be equal to about four microns to about eight microns, and preferably equal to about five microns to about six microns in consideration of the reduction of the parasitic capacitance and the resistance of the data lines 171.

The storage electrodes 137 of the storage electrode lines 131 and the expanded end portions of the drain electrodes 175 are rectangular or square. The storage electrode lines 131 further include curved portions 133 extending from the storage electrodes 137 along the gaps between the pixel electrodes 190.

The TFT array panel 100 further includes a plurality of color filter stripes 230 disposed under the passivation layer 180, and the common electrode panel 200 has no color filter. The color filter stripes 230 extend along the pixel electrodes 190 and there is no color filter stripe near the contact holes 185. Two adjacent color filter stripes 230 are spaced apart from each other on the data lines 171. However, the color filter stripes 230 may overlap with each other to block the light leakage between the pixel electrodes 190. When the color filter stripes 230 overlap each other, a light blocking member 220 disposed on a common electrode panel 200 may be omitted.

The light blocking member 220 in the common electrode panel 200 includes a plurality of blocking islands facing TFTs in the TFT array panel 100.

Each of the cutouts 71 of the common electrode 270 has a corner extension portion connected with the corner portion to convert the V-shaped corner to a Y-shape. The corner extension portion extends in a first direction by a predetermined distance.

Each of the pixel electrodes 190 has a cutout 91 extending in the first direction along a straight line that extends in the first direction from a central transverse portion of a cutout 71 of the common electrode 270.

The semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171, the drain electrodes 175, the semiconductors 151, and the ohmic contacts 161 and 165 using one photolithography step.

A photoresist pattern for the photolithography process has position-dependent thickness, and in particular, it has first and second portions with decreased thickness. The first portions are located on wire areas that will be occupied by the data lines 171, and the drain electrodes 175, and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of the light exposer used for the photolithography. Another example is to use reflowable photoresist. In detail, once a photoresist pattern made of a reflowable material is formed by using a normal exposure mask only with transparent areas and opaque areas, it is subject to a reflow process to flow onto areas without the photoresist, thereby forming thin portions.

As a result, fewer photolithography steps are needed and the manufacturing process is simplified.

Many of the above-described features of the LCD shown in FIGS. 1-5 may be appropriate to the TFT array panel shown in FIGS. 6-9.

An LCD according to other embodiments of the present invention will be described in detail with reference to FIGS. 10 and 11.

Figure 10:
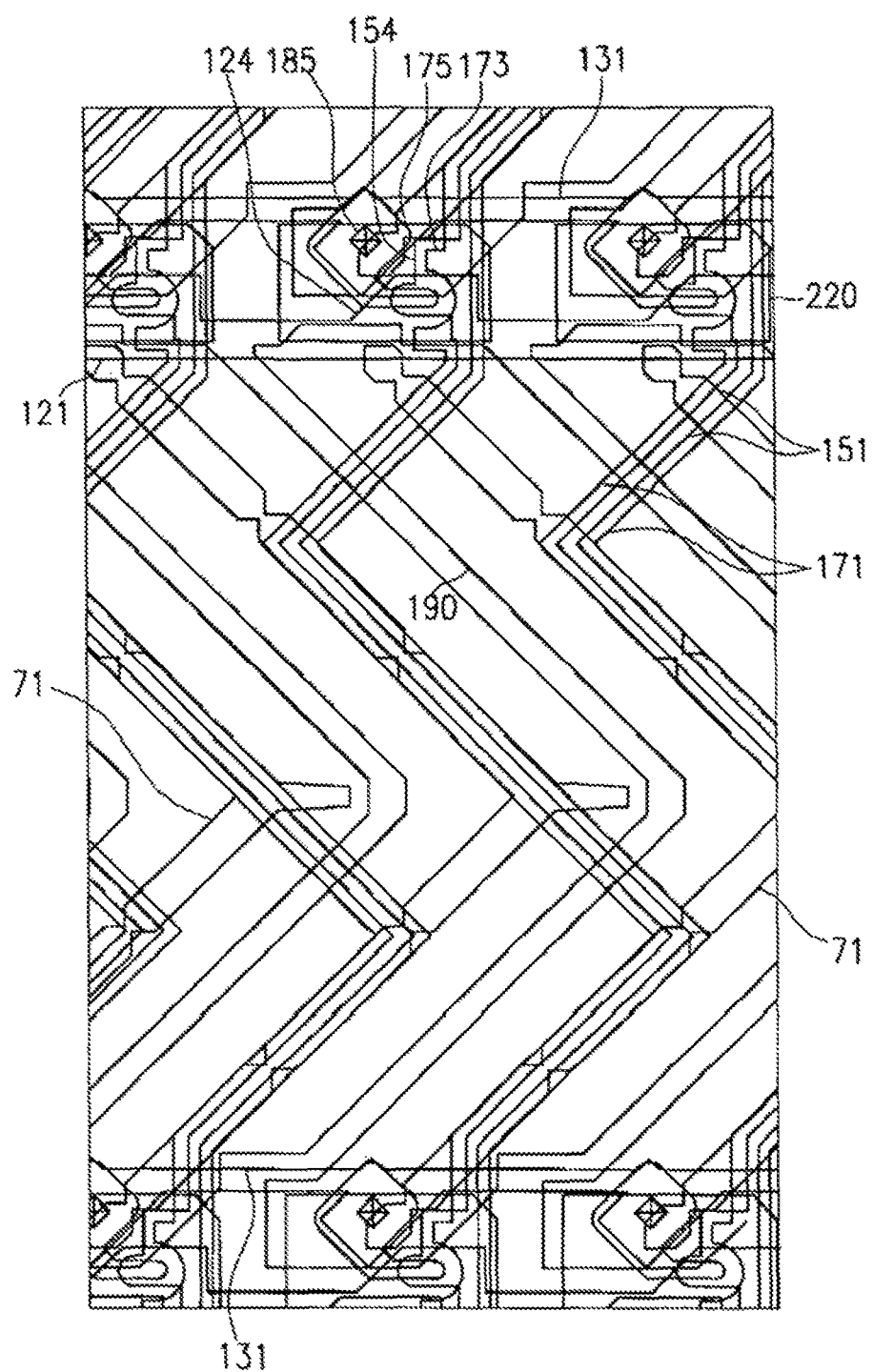
FIGS. 10 and 11 are layout views of LCDs according to other embodiment of the present invention.
Figure 11:
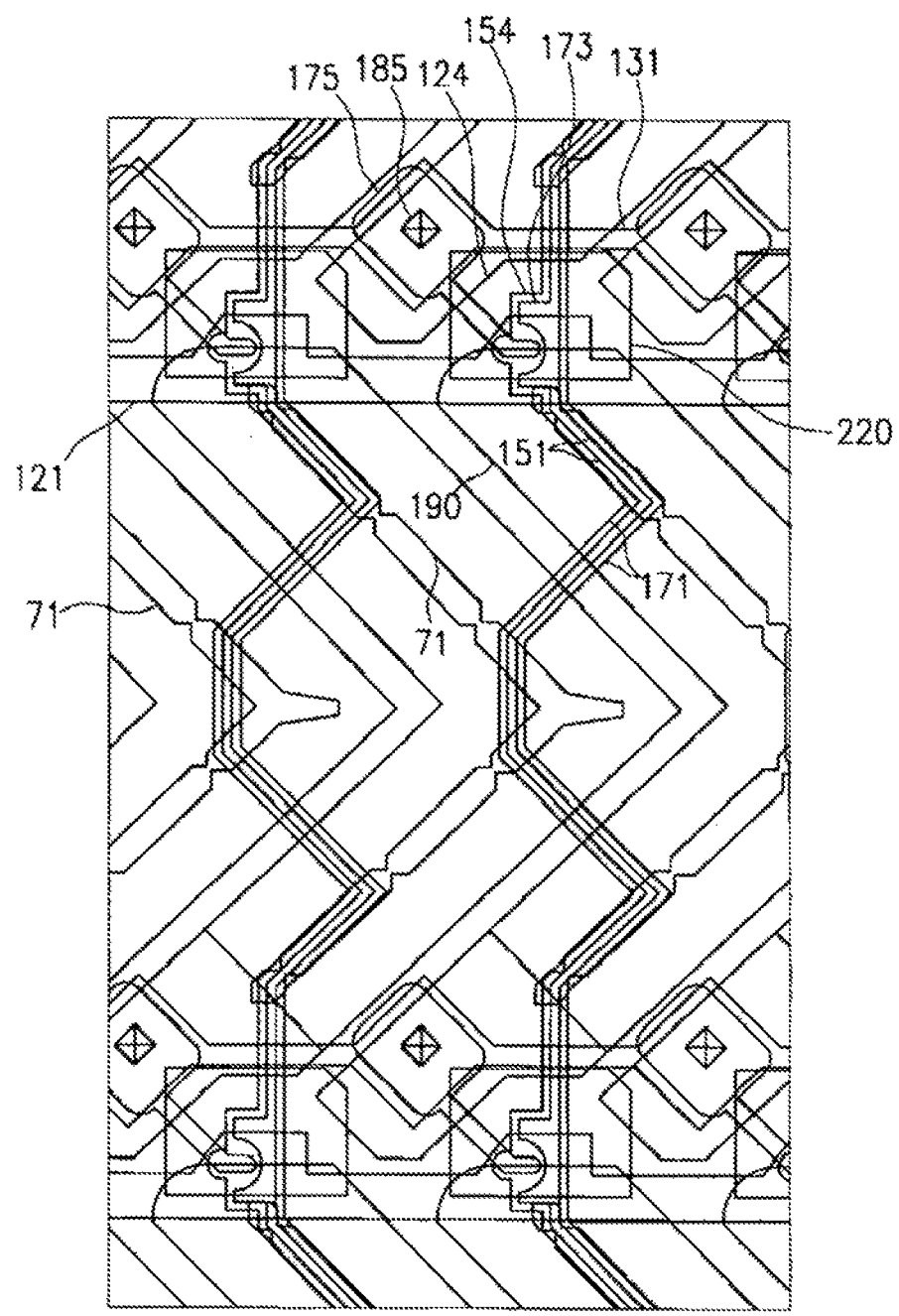

FIGS. 10 and 11 are layout views of LCDs according to other embodiment of the present invention.

Referring to FIGS. 10 and 11, an LCD according to this embodiment also includes a TFT array panel 100, a common electrode panel 200, a LC layer 300 interposed between the panels 100 and 200, and a pair of polarizers 12 and 22 (see FIG. 9) attached on the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and end portions 129 and a plurality of storage electrode lines 131 including a plurality of storage electrodes 137 are formed on a substrate 110. A gate insulating layer 140, a plurality of semiconductor stripes 151 including projections 154, and a plurality of ohmic contact stripes 161 including projections 163 and a plurality of ohmic contact islands 165 are sequentially formed on the substrate 110 provided with the gate lines 121 and the storage electrode lines 131. A plurality of data lines 171 including source electrodes 173 and end portions 179 and a plurality of drain electrodes 175 are formed on the ohmic contacts 161 and 165, and a passivation layer 180 is formed thereon. A plurality of contact holes 181, 182 and 185 are provided at the passivation layer 180 and the gate insulating layer 140, and a plurality of pixel electrodes 190 and a plurality of contact assistants 81 and 82 are formed on the passivation layer 180. An alignment layer 11 is formed on the pixel electrodes 190 and the passivation layer 180.

Regarding the common electrode panel 200, a light blocking member 220, a plurality of color filters 230, an overcoat 250, a common electrode 270 having a plurality of cutouts 71, and an alignment layer 21 are formed on an insulating substrate 210.

Different from the LCD shown in FIGS. 1-5, each of the data lines 171 in the LCD shown in FIG. 10 is bent twice by about a right angle such that there are three linear oblique portions connected by two corner portions. In addition, the corner portion overlaps two pixel electrodes 190 along the cutouts 71. In other words, each of the pixel electrodes 190 overlaps two data lines 171.

A portion of each of the data lines 171, which is disposed between two adjacent TFTs in the data line 171, in the LCD shown in FIG. 11 includes four corner portions spaced apart from each other and connected by linear portions. Two of the corner portions include substantially right angles, while the other two corner portions include obtuse angles. The obtuse corner portions arranged symmetrically around a line extending in the first direction and bisecting the pixel electrodes 190 includes a pair of oblique linear portions making about a right angle with each other. Two of the oblique linear portions disposed near TFTs overlap the cutouts 71. "Oblique," as used herein, indicates that a structure extends in a direction that is parallel to neither the first direction nor the second direction.

The light blocking member 220 in the common electrode panel 200 shown in FIGS. 10 and 11 includes a plurality of blocking islands facing TFTs in the TFT array panel 100.

Many of the above-described features of the LCD shown in FIGS. 1-5 may be appropriate for the TFT array panel shown in FIGS. 10 and 11.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
   a substrate;
   a gate line disposed on the substrate;
   a first data line disposed on the substrate and intersecting the gate line;
   a gate insulating layer disposed between the gate line and the first data line;
   a thin film transistor including a gate electrode connected to the gate line, a source electrode connected to the first data line, and a drain electrode;
   a plurality of color filters disposed on the thin film transistor and the gate insulating layer;
   a passivation layer disposed on the color filters; and
   a first pixel electrode disposed on the passivation layer, connected to the drain electrode, and having a first edge and a second edge obliquely facing the first edge,
   wherein the first data line comprises a first portion disposed above an imaginary line, the imaginary line being disposed between the first edge and the second edge of the first pixel electrode.

2. The thin film transistor array panel of claim 1, wherein the first pixel electrode has a generally chevron shape.

3. The thin film transistor array panel of claim 2, further comprising a second pixel electrode disposed adjacent to the first pixel electrode,
   wherein the first data line overlaps the first and the second pixel electrodes.

4. The thin film transistor array panel of claim 2, further comprising a second data line disposed adjacent to the first data line,
   wherein the first pixel electrode overlaps the first and the second data lines.

5. The thin film transistor array panel of claim 2, wherein the first portion of the first data line is generally equidistant from the first and the second edges of the first pixel electrode.

6. The thin film transistor array panel of claim 2, wherein the first data line further comprises a perpendicular portion that is generally perpendicular to the gate line.

7. The thin film transistor array panel of claim 2, wherein the first data line further comprises a second portion disposed below the imaginary line and extending in an obliquely opposite direction from an extended direction of the first portion of the first data line.

8. The thin film transistor array panel of claim 7, wherein the first data line further comprises a perpendicular portion that is generally perpendicular to the gate line and disposed between the first portion and the second portion of the first data line.

9. The thin film transistor array panel of claim 7, wherein the first data line further comprises a perpendicular portion that is generally perpendicular to the gate line and disposed either above the first portion or below the second portion of the first data line.

10. The thin film transistor array panel of claim 2, wherein the first portion of the first data line is extended to a portion of the first pixel electrode so as to overlap an adjacent pixel electrode.

11. The thin film transistor array panel of claim 2, wherein the first data line further comprises a crossing portion crossing at generally right angles with one of the first edge and the second edge of the first pixel electrode.

* * * * *